United States Patent [19]

Seely

[11] Patent Number: 4,557,578

[45] Date of Patent: Dec. 10, 1985

[54] VIEWFINDER FOR AUTOFOCUS CAMERAS

[75] Inventor: Neil G. Seely, Rochester, N.Y.

[73] Assignee: Eastman Kodak Company, Rochester, N.Y.

[21] Appl. No.: 685,866

[22] Filed: Dec. 24, 1984

[51] Int. Cl.⁴ ............................................. G03B 13/16
[52] U.S. Cl. .................................. 354/400; 354/409; 354/225; 354/289.1
[58] Field of Search ............... 354/409, 400, 166, 402, 354/199–201, 219, 224, 225, 289.1, 289.12, 474, 475

[56] References Cited

U.S. PATENT DOCUMENTS

| | | | |
|---|---|---|---|
| 4,104,651 | 8/1978 | Matsumoto | 354/25 |
| 4,114,994 | 9/1978 | Kondo | 352/139 |
| 4,300,826 | 11/1981 | Aoki et al. | 354/60 L |
| 4,354,754 | 10/1982 | Takahashi et al. | 354/409 |
| 4,367,463 | 1/1983 | Suzuki et al. | 340/700 |
| 4,374,612 | 2/1983 | Matsumura | 354/53 |

FOREIGN PATENT DOCUMENTS

| | | | |
|---|---|---|---|
| 60428 | 4/1984 | Japan | 354/409 |
| 2068584 | 8/1981 | United Kingdom | 354/419 |

Primary Examiner—William B. Perkey
Attorney, Agent, or Firm—Roger A. Fields

[57] ABSTRACT

An autofocus camera has an optical viewfinder for composing a scene to be photographed, and an autofocus frame in the viewfinder for framing the focus (main) subject in the scene. Electrically activated means, such as a plurality of light emitting diodes (LED's), are provided for highlighting the autofocus frame, especially in a dim or moderate light situation, to prominently call attention to whether or not the focus subject is within the autofocus frame. Manually operated means, including a shutter release, activate the highlighting means before the scene can be photographed.

In a preferred embodiment, the autofocus frame includes a plurality of indicator marks disposed in spaced relation about the center of the viewfinder. The LED's are arranged in the viewfinder to be seen at the respective spaces between the indicator marks. When the shutter release is partially depressed, the LED's combine with the indicator marks to define the autofocus frame, thereby highlighting such frame.

5 Claims, 5 Drawing Figures

VIEWFINDER FOR AUTOFOCUS CAMERAS

BACKGROUND OF THE INVENTION

1. Field of the Invention

The invention relates generally to optical viewfinders for autofocus cameras, and in particular to a viewfinder having an autofocus frame for framing the focus subject, i.e., the main subject the photographer wishes to focus on, in the picture to be taken. More specifically, the invention relates to electrically activated indicator means for highlighting the autofocus frame to prominently call attention to whether or not the focus subject is within the autofocus frame before the picture is taken.

2. Description of the Prior Art

Automatic focusing is one feature which was long neglected in the development of camera automation. However, the introduction of an autofocus module in a 35 mm camera several years ago has brought a large number of inexpensive autofocus cameras into the market. In these cameras, the focusing distance, i.e., the camera-to-subject distance at which the taking lens will be in focus, is automatically measured and the taking lens is driven to a focused position in accordance with the measured distance.

One recent example of an inexpensive rangefinder type 35 mm autofocus camera, namely the Ricoh FF-3AF, is operated as follows:

1. The scene is composed in a projected reticle viewfinder with the focus subject located within an autofocus frame at the center of the viewfinder.
2. The shutter release button is depressed approximately halfway until either a near zone symbol or a far zone symbol lights up in the viewfinder to indicate that the focusing distance has been set within a near or far zone. The distance data is inputted to a focus memory, and can only be cancelled by releasing the shutter release button. If the near mark blinks, the camera is too close to the main subject for the focus distance to be set and should be moved back a little.
3. The shutter release button is depressed fully, which initiates movement of the taking lens to a focus position derived from the distance data in the focus memory, and the picture is taken.

If you want to photograph two (or more) people using the Ricoh camera or other similarly operated cameras, there may be instances where both of the people cannot be located within the autofocus frame in the viewfinder. If you release the shutter then, only the background will be in focus and the people which are the main subject will be out of focus. Accordingly, with the Ricoh camera, a prefocus procedure is recommended, as follows:

1. Move the camera so that only one of the people is located within the autofocus frame.
2. Depress the shutter release button halfway to set the focusing distance.
3. Holding your finger in that position on the shutter release button, return the camera to its former position so that both of the people are centered in the viewfinder again.
4. Depress the shutter release button fully to take a picture.

This procedure also applies to situations where you want the main subject you wish to focus on to be located off-center in the viewfinder when the picture is taken.

In many of the recently introduced rangefinder type autofocus cameras, the autofocus frame is only faintly visible in the projected reticle viewfinder, especially in a moderately lit or dim light situation. Consequently, the autofocus frame does not prominently call attention to the area of the picture that the autofocus system is ranging on to set the focusing distance. Thus, when the main subject you wish to photograph is outside the autofocus frame, you may forget to use the pre-focus procedure described above. As a result, the autofocus system will focus on the background so that the main subject will be out of focus.

SUMMARY OF THE INVENTION

The above-described problems relating to viewfinders for autofocus cameras are believed to be solved by the invention. According to the invention, there is provided, in an autofocus camera of the type wherein an autofocus frame is disposed in a viewfinder for framing the focus (main) subject in a scene to be photographed, the improvement comprising:

electrically activated means for highlighting the autofocus frame, especially in a dim or moderate light situation, to prominently call attention to whether or not the focus subject is within the autofocus frame; and manually operated means for activating the highlighting means before the scene can be photographed.

In a preferred embodiment of the invention, the autofocus frame includes a plurality of indicator marks disposed in spaced relation about the center of a projected reticle viewfinder. The electrically activated means includes a plurality of light emitting diodes (LED's) arranged in the viewfinder to be seen at the respective spaces between the indicator marks. When the shutter release button is partially depressed, the LED's are energized to cooperate with the indicator marks to define the autofocus frame, thereby highlighting the autofocus frame to prominently call attention to whether or not the focus subject is within such frame.

BRIEF DESCRIPTION OF THE DRAWINGS

The invention will be described in connection with the drawings, wherein.

DESCRIPTION OF THE PREFERRED EMBODIMENT OF THE INVENTION

The invention is described as being embodied in a rangefinder type 35 mm autofocus camera having a projected reticle viewfinder. Because such photographic cameras have recently become well known, e.g., the Ricoh FF-3AF and the Cosina CX-70, this description is directed in particular to camera elements forming part of or cooperating directly with the preferred embodiment. It is to be understood, however, that camera elements not specifically shown or described may take various forms known to persons of ordinary skill in the art.

Figure 1:
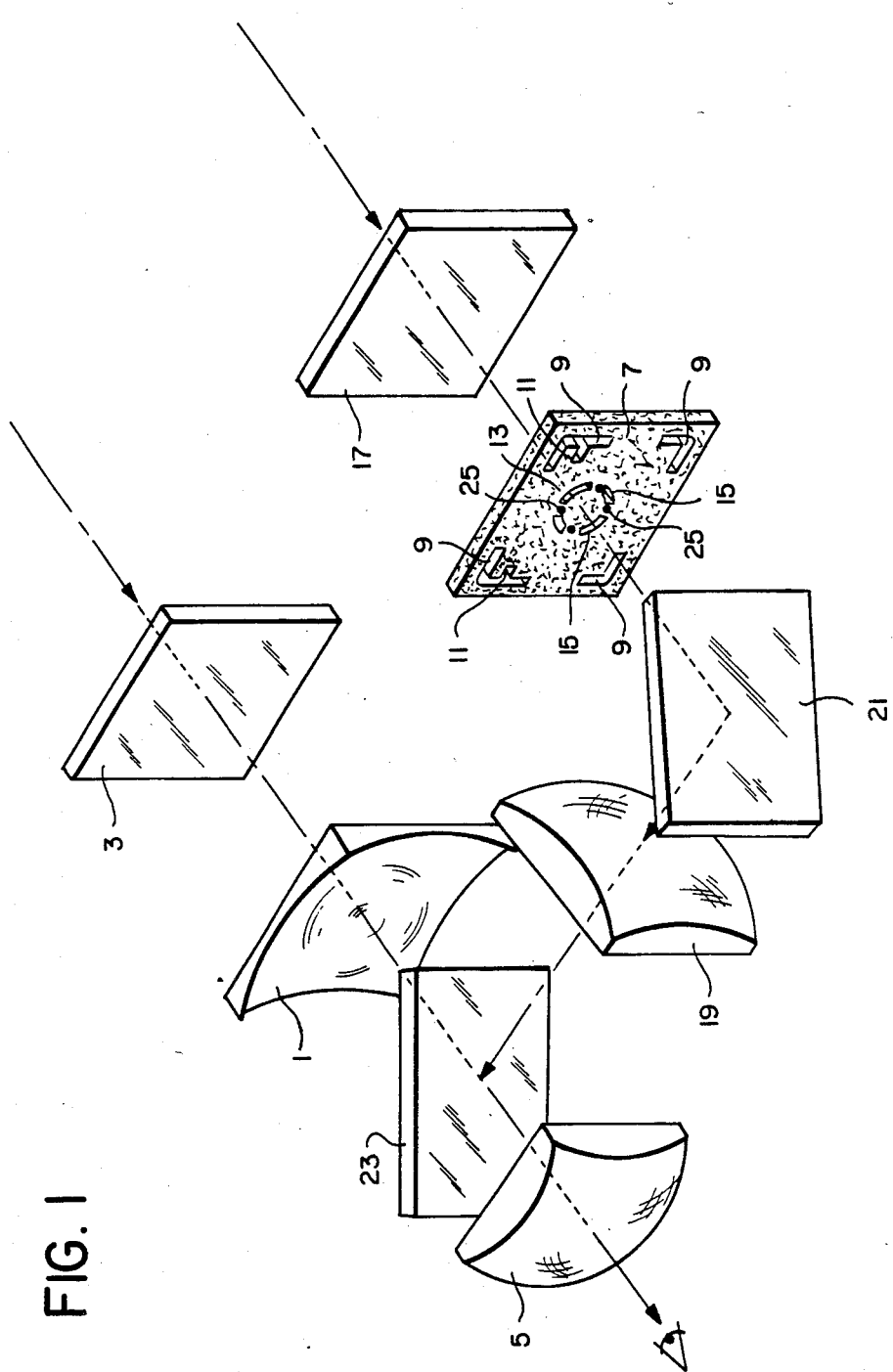
FIG. 1 is an exploded perspective view of a projected reticle viewfinder for an autofocus camera, in accordance with a preferred embodiment of the invention.

Referring now to the drawings, and in particular to FIG. 1, there is shown a projected reticle viewfinder for use in a known rangefinder type 35 mm autofocus camera. As illustrated, a negative lens 1 is disposed between a viewing window 3 at the front of the camera body, not shown, and a positive (eyepiece) lens 5 at the rear of the camera body to enable a photographer to view an erect image of a scene to be photographed. A mask 7 includes bright line (field of view) frames 9 which define the finder field, parallex correction marks 11, and an autofocus frame 13. The autofocus frame 13 is formed in a segmented circle about the center of the finder field and is defined by several indicator marks 15 arranged in spaced relation for framing the focus subject, i.e., the main subject the photographer wishes to focus on, in the picture to be taken. Preferably, the mask 7 is a frosted glass plate and the bright line frames 9, the parallex correction marks 11, and the indicator marks 15 of the autofocus frame 13 are formed by elongate openings in an opaque coating on the glass plate, according to a known construction. The mask 7 is located behind an illuminating window 17 at the front of the camera body. A positive lens 19 is disposed between a 45° inclined mirror 21 and a similarly inclined beamsplitter 23. The beamsplitter 23 is disposed between the positive lens 1 and the eyepiece lens 5. Thus, the photographer can view an erect image of the bright line frames 9, the parallex correction marks 11, and the indicator marks 15 of the autofocus frame 13, superimposed on the erect image of a scene to be photographed, by looking through the eyepiece lens 5.

As described above in connection with the prior art, in many of the recently introduced rangefinder type autofocus cameras, the autofocus frame in the projected reticle viewfinder does not prominently call attention to the area of the scene that the camera's autofocus system is ranging on to set the focusing distance. This is especially the case in a moderately lit or dim light situation. Consequently, the photographer may inadvertently allow the autofocus system to focus on the background so that the main subject he wishes to focus on will be out of focus.

Figure 2A:
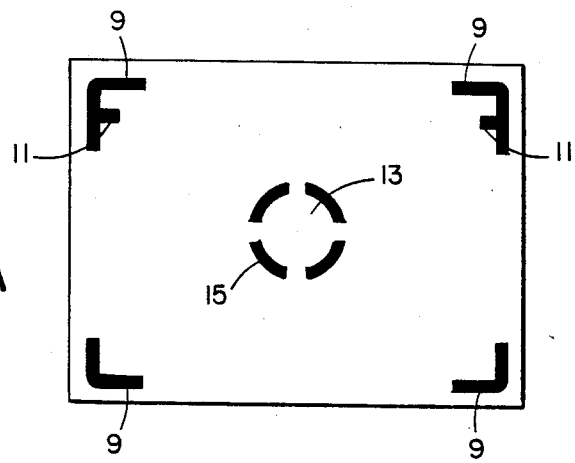
FIGS. 2A and 2B are elevational views of the field of view of the viewfinder, respectively showing the viewfinder in inactive and activated states.
Figure 2B:
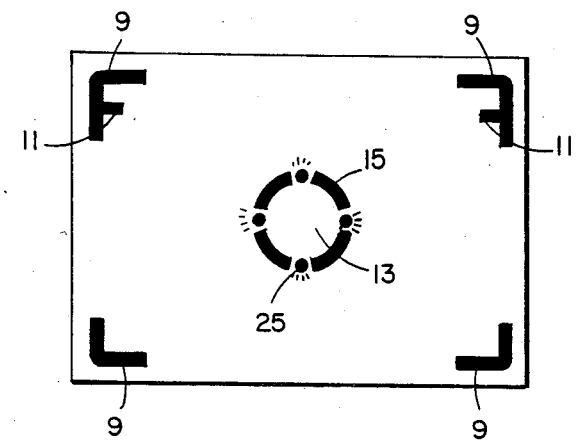

In accordance with the invention, the viewfinder is improved by providing several light emitting diodes (LED's) 25 arranged on the mask 7, as shown in FIG. 1, to be seen (when energized) at the respective spaces between the indicator marks 15 of the autofocus frame 13. Preferably, the LED's 25 are partially embedded in the glass plate which constitutes the mask 7. As shown in FIGS. 2A and 2B, respectively, the LED's 25 have a de-activated (non-energized) state in which they are not visible in the viewfinder and an activated (energized) state in which they are visible in the viewfinder. In their activated state, the LED's 25 combine with or supplement the indicator marks 15 to define the autofocus frame 13, thereby highlighting such frame to prominently call attention to whether or not the focus (main) subject is within the autofocus frame. The LED's 25 may be connected to an intensity modulator, not shown, which in turn is connected to an ambient light sensor to vary the intensity of the LED's in accordance with the brightness of a scene to be photographed.

Although not shown, the several LED's 25 may be encapsulated in individual transparent light In this instance, the LED's 25 would be located between the mask 7 and the illuminator window 17, with the light pipes extending through the mask 7 to the respective spaces between the indicator marks 15. Conversely, only one LED might be piped to such spaces.

OPERATION

Figure 3:
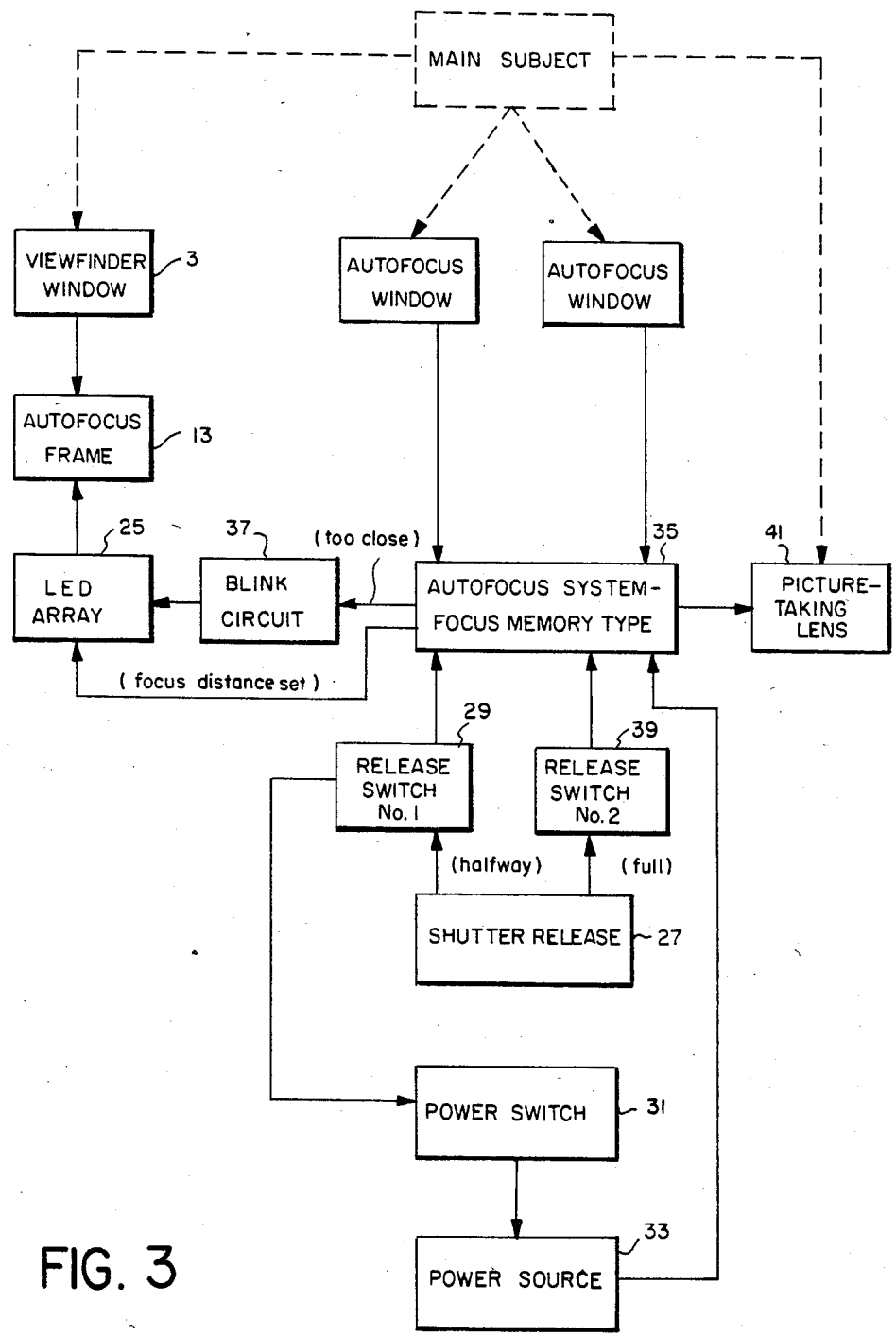
FIG. 3 is an explanatory diagram depicting a preferred mode of operation of the viewfinder and an associated autofocus system.

FIG. 3 depicts a preferred mode of operation of the improved viewfinder and a known focus memory type-autofocus system in an autofocus camera. The preferred mode of operation is as follows:

1. The scene is composed in the viewfinder window 3 with the focus (main) subject located within the autofocus frame 13.

2. A shutter release button 27 is depressed approximately halfway to close a first release switch 29, in turn closing a power switch 31 to energize a power source 33. The power source 33, when energized, activates a focus memory typeautofocus system 35 to set the focus distance, which is inputted to the focus memory, and to energize the LED's 25, which then highlight the autofocus frame 13 to prominently call attention to the area of the scene within the autofocus frame. The distance data in the focus memory can only be cancelled by releasing the shutter release button 27. If the camera is too close to the main subject for the focus distance to be set, a known blink circuit 37, such as one including an astable oscillator, causes the LED's 25 to blink on and off, alerting the photographer that the camera should be moved back a little.

3. The shutter release button 27 is depressed fully to close a second release switch 39, in turn causing the autofocus system 35 to initiate movement of a taking lens 41 to a focus position derived from the distance data in the focus memory, and the picture is taken. After the exposure interval is concluded, the taking lens 41 is returned to a home (extended) position.

Figure 4:
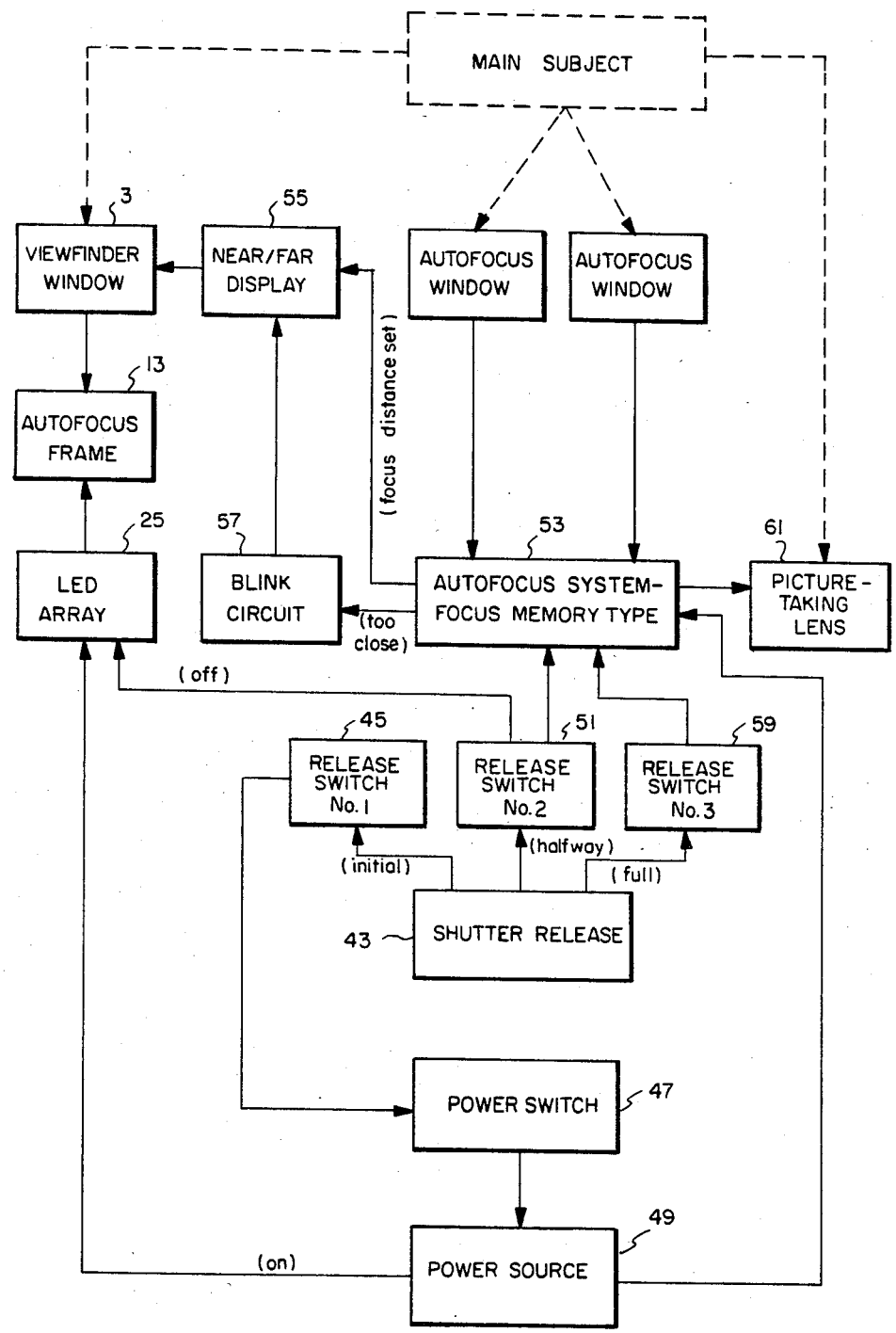
FIG. 4 is an explanatory diagram depicting an alternative mode of operation of the viewfinder and the autofocus system.

FIG. 4 depicts an alternative mode of operation of the improved viewfinder and a known focus memory type-autofocus system in an autofocus camera. The alternative mode of operation is as follows:

1. The scene is composed in the viewfinder window 3 with the focus (main) subject located within the autofocus frame 13.

2. A shutter release button 43 is slightly depressed to close a first release switch 45, in turn closing a power switch 47 to energize a power source 49. The power source 49, when energized, energizes the LED's 25, which then highlight the autofocus frame 13 to prominently call attention to the area of the scene within the autofocus frame.

3. The shutter release button 43 is depressed approximately halfway to close a second release switch 51, in turn de-energizing the LED's 25 and activating a focus memory type-autofocus system 53 to set the focus distance. The set distance is inputted to the focus memory and is generally indicated to the photographer by a near zone symbol or a far zone symbol of a near/far display 55 which lights up in the viewfinder at a location adjacent the finder field. The distance data in the focus memory can only be cancelled by releasing the shutter release button 43. If the camera is too close to the main subject for the focus distance to be set, a known blink circuit 57 causes the near zone symbol to blink on and off, alerting the photographer that the camera should be moved back a little.

4. The shutter release button 43 is depressed fully to close a third release switch 59, in turn causing the autofocus system 53 to initiate movement of a taking lens 61 to a focus position derived from the distance data in the focus memory, and the picture is taken. After the exposure interval is concluded, the taking lens 61 is returned to a home (extended) position.

While the invention has been described with reference to a preferred embodiment and an alternative embodiment, it will be understood that various modifications may be effected within the ordinary skill in the art without departing from the scope of the invention. For example, instead of the LED's 25, other electrically activated indicator means, such as liquid crystal elements, may be used to highlight the autofocus frame 13. Moreover, such electrically activated indicator means may be arranged to circumscribe or to otherwise draw attention to the autofocus frame.

I claim:

1. In an autofocus camera of the type wherein (a) a viewfinder is provided for composing a scene to be photographed and (b) an autofocus frame is provided in said viewfinder for framing the focus subject in the scene, the improvement comprising:

electrically activated means for highlighting said autofocus frame to prominently call attention to whether or not the focus subject is within the autofocus frame; and manually operated means for activating said highlighting means before autofocusing can occur.

2. The improvement as recited in claim 1, wherein said autofocus frame is defined by a plurality of indicator marks disposed in spaced relation about the center of said viewfinder, and wherein said highlighting means includes a plurality of light emitting diodes arranged in said viewfinder to be seen at the respective spaces between said indicator marks.

3. In an autofocus camera of the type wherein (a) a viewfinder is provided for composing a scene to be photographed and (b) an autofocus frame in said viewfinder is defined by a plurality of indicator marks disposed in spaced relation for framing the focus subject in the scene, the improvement comprising:

a plurality of indicator means arranged to be seen at the respective spaces between said indicator marks, said plurality of indicator means having a deactivated state in which they are substantially invisible in said viewfinder and an activated state in which they are visible in the viewfinder; and means for activating said plurality of indicator means to change them from their deactivated state to their activated state, whereby the plurality of indicator means cooperate with the plurality of indicator marks to define said autofocus frame.

4. The improvement as recited in claim 3, wherein said activating means includes blink circuit means for blinking said plurality of indicator means on and off in the event said camera is too close to the focus subject for autofocusing to occur.

5. The improvement as recited in claim 3, wherein said activating means includes means for activating said plurality of indicator means before autofocusing can occur.

* * * * *